United States Patent
Richardson et al.

[11] 3,891,556
[45] June 24, 1975

[54] MULTI-LAYER BRAIDED TUBULAR MEMBRANE REINFORCEMENT

[75] Inventors: John L. Richardson; Alexander O. Brodie, both of Orange; Clarke H. Lewis, Fountain Valley, all of Calif.

[73] Assignee: Oxy Metal Industries (Intra) Inc., Lyndhurst, N.J.

[22] Filed: Nov. 15, 1971

[21] Appl. No.: 198,612

[52] U.S. Cl. .............. 210/490; 210/23 X; 210/490
[51] Int. Cl. ............................................. B01d 31/00
[58] Field of Search ............ 210/23, 321, 490, 500, 210/433; 29/163.5 F

[56] References Cited
UNITED STATES PATENTS

| | | |
|---|---|---|
| 2,864,506 | 12/1958 | Hiskey .......................... 210/23 X |
| 3,457,170 | 7/1969 | Havehs .......................... 210/490 X |
| 3,547,272 | 12/1970 | Shaines et al. ................ 210/490 X |
| 3,676,193 | 7/1972 | Cooper et al. ................. 210/490 X |
| 3,695,964 | 10/1972 | Shaines et al. ................ 210/500 X |

Primary Examiner—Frank A. Spear, Jr.
Attorney, Agent, or Firm—Arthur E. Kluegel; Richard P. Mueller; B. F. Claeboe

[57] ABSTRACT

This invention is directed to the art of containing a fragile membrane tube of approximately 8 mils wall thickness by braiding in single or multiple layers such that working pressures of up to 2,000 psig can be utilized. The embodiment here described as an example relates to flexible braiding used as a membrane pressure support in the reverse osmosis method of fluid purification, separation and concentration. It is also applicable for ultrafiltration applications.

2 Claims, 5 Drawing Figures

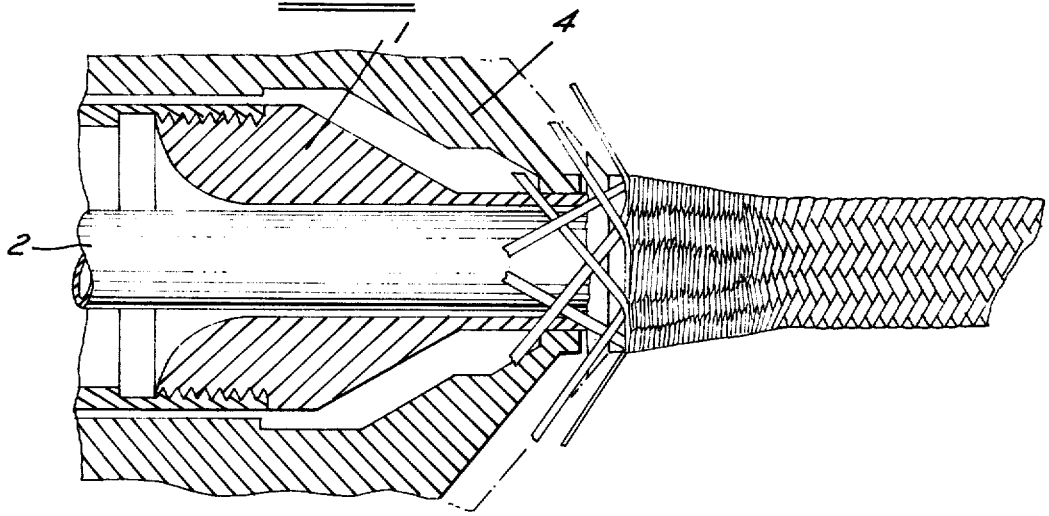
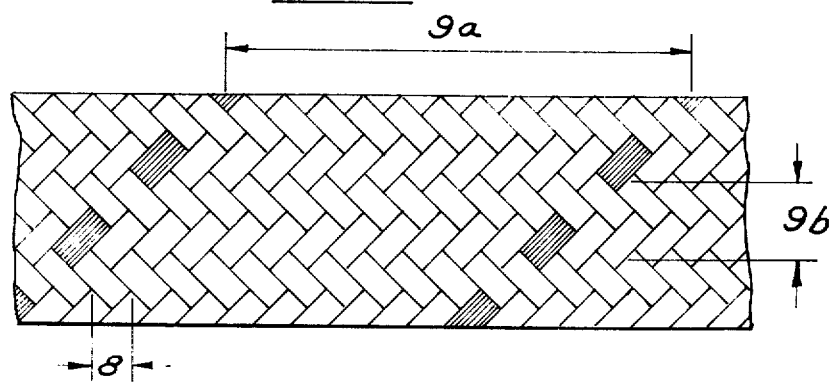
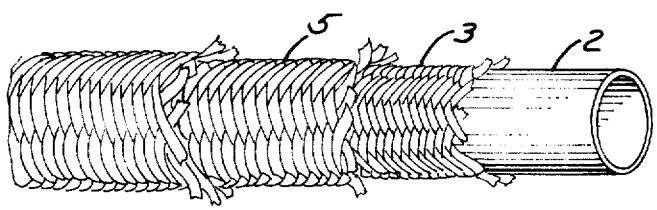

INVENTORS
JOHN L. RICHARDSON
ALEXANDER O. BRODIE
CLARKE H. LEWIS
BY Keith L. Zerschling
Thomas H. Osten
ATTORNEYS 3,891,556

MULTI-LAYER BRAIDED TUBULAR MEMBRANE REINFORCEMENT

BACKGROUND OF THE INVENTION

The use of permeable tubing for filtration purposes in fluid purification systems is well known and it is common practice to cast such tubing in various materials, one of which is cellulose acetate. Such tubing is commonly referred to as a membrane tube and in order to achieve the optimum degree of permeability the walls of such tubes are often as thin as 4 to 10 mils. Accordingly, because the fluid to be purified must be forced through the walls of the tubing under pressure, a pressure support must be provided to avoid tube rupture. Such support has in the past consisted of rigid and semi-rigid tubing of greater mechanical strength than the membrane tube and perforated or ribbed to allow passage of the product fluid (fluid after filtration).

This method is satisfactory (but costly) for use on membrane tubes when used in straight lengths and on those not subject to severe radial formation, as in a coiled configuration, but it has been found that in order to achieve a coiled formation, as taught in our copending application, "Helical Reverse Osmosis Segment," other methods are to be preferred, hence, the present invention, a description of which follows and which will describe in detail a unique method of multiple layer braiding. The simple braiding of tubes for reinforcing purposes is well known in the art and tubing so braided is frequently employed in hydraulic systems where some degree of flexibility is required.

However, for the reverse osmosis method of fluid separation, such simple braiding is not adequate in that, dependent on the tension and the yarn angle in the resultant braid, the simple reinforcement will tend to resist lengthwise radial deflection of the tube, say in a spool formation, with resultant buckling of the braid structure and interior membrane (buckled membrane areas tend to be local regions for failure of the membrane) due to the "lock-angle" of the woven braid. If the braid is woven loosely to allow deflection, the braiding yarns will separate, leaving the membrane tube locally unsupported and thereby vulnerable to rupture. It will be realized that in orthodox hydraulic systems, for example, where braiding is interspersed between the rubber tubes, simple braiding is acceptable in that considerable mechanical strength and flexibility exists in the tubing itself before braiding.

Accordingly, we have invented a new and unique method of continuous single or multi-layer braiding to form a high pressure support for a thin cast membrane tube, which tube, because of our invention, can be of greater length than those previously used and can be afterwards confined in a small volume, for instance, wrapped into the form of a spool of tubing, without detriment to the membrane.

THE INVENTION

It is the principal object of the present invention, therefore, to provide a braided tube reinforcement which is applied in such a manner as to continuously support a fragile tube.

It is another object of this invention to provide a braided tube reinforcement which will prevent lengthwise elongation of the tube being supported, or if required, will allow such elongation to a predetermined degree.

It is a further object of this invention to provide a braided tube reinforcement, the characteristics of which can be predetermined.

It is yet another object of the present invention to provide a finely braided or woven smooth first (or inner) layer of reinforcement in contact with the membrane tube and a subsequent layer or layers of coarser grade the purpose of which is to impart great burst-resistant strength to the assembly.

It is also an object of this invention to provide a reinforcement which is porous to the extent that very little impedance is presented to the flow of product fluid.

Other objects of the invention and advantages over the existing art will be apparent to those to whom the art is familiar after reading the description hereunder and by reference to the drawings where FIG. 1 is an illustration of a multi-layer tubular membrane reinforcement shown in simplified form, where the inner braid, 3, is of finer denier than the outer layers.

FIG. 2 shows how the yarn angle in the braid is defined and the definition of the number of picks (or "cross-overs") per inch.

FIG. 3 illustrates the braiding of a membrane tube where the oscillating hollow mandrel moves the completed braid from a tapered sleeve to a predetermined angular configuration and with predetermined tension onto the said membrane tube.

Figure 5:
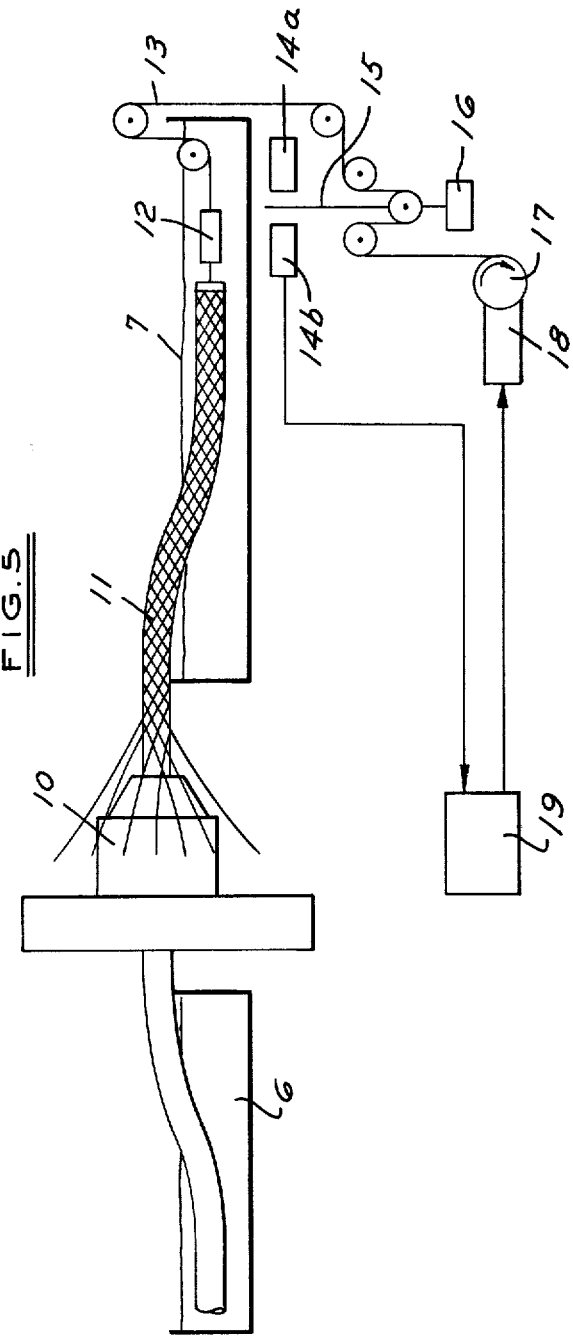
FIG. 5 is a schematic representation of the overall braiding and braid/membrane tensioning and fluid immersion system required in order to achieve the necessary braid angles and closeness of fit between each braided layer and the underlying tube or layer.

The actual braiding of a membrane tube is performed with machines readily available; for instance, with machines of the type manufactured by The New England Butt Company, of Providence, R.I., the Wardwell Braiding Machine Company, of Central Falls, R.I., and others. Braiding is best accomplished with the membrane tube in a horizontal position. In addition, precautions are taken to ensure adequate lubrication of the machine parts without leakage of the lubrication onto the product. It has been found to be mandatory, in the case of cellulose acetate membrane tubes, to keep the membrane tube immersed in water before braiding and to maintain both it and the braid in a wet state continuously. Accordingly, the tube is placed in, drawn from, and returned to suitable water-filled troughs, 6 and 7 in FIG. 5, such that the membrane having passed through the braiding machine is thus kept in a wet condition at all times.

The braiding for one or more layers can be axially reinforced by warp threads or can be braided near to or at the so-called "lock" angle (54° 44 feet; calculated from a single layer braid), or can be braided at other angles determined by the equilibrium condition of several layers working in conjunction with each other. For a typical three-layer combination of angles see FIG. 4. For the method of measuring the number of picks or cross-overs per inch see FIG. 2 where 9a is the "lead", 9b is a "line" around the circumference of the braided tube and 8 represents one "pick". With reference again to warp threads it has been found that warp threads tend to render the braided assembly less flexible, which in turn could provoke an undesirable buckling of the tube wall where it is desired to coil or bend the reinforced tubing. A variety of materials can be used in the construction of this braided support. Fiberglass yarn coated or uncoated, can be used. The coatings can include such materials as vinyl, neoprene, butyl, acrylic materials, RFL (resorcinol-formaldehyde-latex), Teflon and any other elastomeric or polymeric material which will tend to reduce the abrasion sensitivity of the fiberglass yarn. These materials can be used to impregnate the fiberglass yarn (for the reduction of inter-filament abrasive damage) as well as to coat it for the reduction of inter-strand, or filament bundle abrasive damage. Other yarn materials would include polyesters, nylon, rayon, cotton, and linen. Any other high strength yarn material, even wire could be used, if desired, provided the wire layer is properly isolated from the membrane by, for example, a braided polyester yarn of sufficiently small diameter (fine denier). A particularly unique feature of the multi-layer support structure is that the inner layer or layers can be manufactured from fine denier yarn to provide a smoother uniform inner surface against which the membrane will bear while the outer layers can be manufactured from heavier yarn of high strength to provide the majority of the pressure containment capability.

Weaving can also be used to prepare inner and outer layers. The woven structure is manufactured using a circular loom of commercial type such as the Chernack type. Another alternative would be to knit one or more of the layers.

A considerable amount of flexibility is obtained from this type of appratus, such that a high strength, smooth inner surface, tubular support structure can be manufactured using any one or more from the entire range of materials indicated above. Dimensional stability during high pressure applications is a particular virtue of the braided and woven support structures.

A SPECIFIC EXAMPLE

Highly successful reinforced semipermeable tubing capable of resisting internal pressures of as high as 2000 psig and exhibiting a high rejection of sodium chloride from dilute solutions has been prepared employing as the semipermeable membrane cellulose acetate tubing having a diameter of approximately one quarter to 1 inch and a wall thickness of about 0.008 inches. This reinforced tubing is capable of being bent around a very small radius when it is pressurized with moderately hot water.

Figure 4:
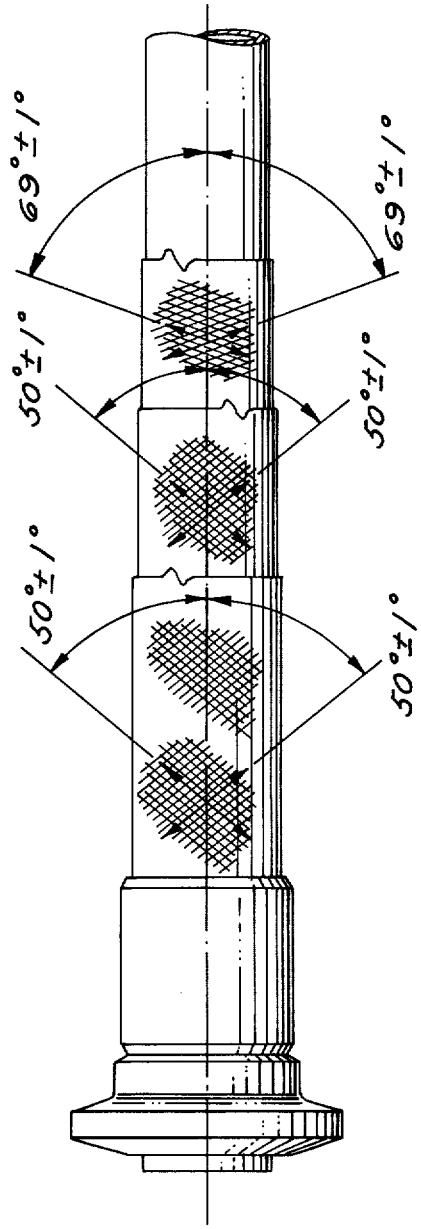
FIG. 4 is a schematic representation of a multi-layer braid support system with the angles specified for minimum membrane tube elongation under pressurization with yarns specified below.

It is essential that this cellulose acetate semipermeable membrane tube be kept wet at all times subsequent to its formation by casting. The reinforcing braided layer immediately adjacent the cellulose acetate semipermeable membrane is braided from a 1100 denier dacron polyester yarn, zero twist. This braiding is accomplished on a conventional braiding machine with each yarn being made up of two individual 1100 denier fibers. This inner low denier reinforcing layer is applied with the fibers at an angle of approximately 69° with the axis of the semipermeable tube as illustrated in FIG. 4. We have found that there is a distinct advantage to having the inner layer of the fine denier yarn braided at an angle greater than the lock angle. Such braiding has been found to minimize any tendency for the membrane tube to buckle or distort if afterwards coiled or bent to a radial configuration.

Referring again to FIG. 3, the sleeve 1 provides a support for the yarn tension required in the braiding, weaving, or knitting process, it also acts as a guide for the membrane tube 2. The finished brade (or other yarn construction) is pushed off from this sleeve (which is very slightly tapered at its end) by an oscillating cone (or dome) 4, FIG. 3 which is fitted to the back of the sleeve and which operates at a predetermined rate. The inside of the sleeve is a close fit to the outside of the tubular membrane to provide good support for the membrane as it comes out of the sleeve and as the finished woven, braided, or knitted support is sloughed onto it. The operation of this oscillating hollow mandrel is, of course, synchronized with the operation of the braiding, weaving, or knitting machine. Interchangeable sleeves and interchangeable oscillating domes are used to provide the capability for different layers of braid, woven, or knitted hose as well as different weights and types of yarn materials to be used in the manufacture of the hose. The inside bearing surfaces of the oscillating dome 4 (FIG. 3) are made from Teflon or other material having similar properties to resist wear and abrasion between the fixed sleeve 1 and the dome 4 (FIG. 3).

The foregoing is descriptive of a method of applying the first layer of braiding in which 2200 denier polyester yarn could be used in conjunction with a tension force on the membrane tube of 14 to 18 ounces. The second and third layers could typically be braided with 4400 denier polyester yarn with a tube tension of 30 to 34 ounces and 62 to 66 ounces, respectively. The required angles for a "locked" multi-layer braid are shown in FIG. 4.

Such a combination of braids over a 1 inch tubular membrane will provide a smooth, non-abrasive surface against which the membrane tube will expand under pressure and overlaying braids capable of resisting an internal hydraulic operating pressure of greater than 1750 psig, a pressure which has been frequently attained during tests with minimal resulting expansion in tube diameter or elongation of tube length.

It is also desirable to maintain, through the application of correct yarn tension, a close fit between the first reinforcement of fine denier yarn and the membrane tube.

To facilitate a tight fit between the membrane 2 and the braided or woven support structure 5 (FIG. 1), a tensioning system is used during the braiding or weaving process to provide a predetermined amount of tension on the finished product as it comes off the braiding or weaving machine. This tensioning system is vital in that it not only provides for a tight fit but also provides a degree of control over the geometry of the braid. Depending upon the weight and type of yarn and the structure of the supports to be manufactured, tensions from as little as 2 ounces to a high as 5 to 10 pounds are used to provide the required conditions. Closeness of fit and braid geometry control are particularly important requirements. Their control makes it possible to limit the amount of stretch in the membrane during the remaining manufacturing process and during use. The tensioning can be automated such that it provides a fixed predetermined amount of tension by pulling the finished support structure/membrane off the machine at a rate consistent with the machine's output. It is capable of operating not only over a wide range of tension but also over a wide range of take-off speeds. An example of such a system is shown in FIG. 5, wherein 10 is the head of the braider, circular loom, or knitting machine, 11 is the braided tube with membrane inside, and 12 is the tensioning carriage which provides a means for supporting a corrosion-resistant spring gauge (for measurement of the tension) and attaching the pulling line 13 to the membrane/braid assembly. The membrane tube and the membrane tube with a braided covering are kept wet by withdrawal from and insertion into the water-filled troughs, 6 and 7. One method of automatic tension control is achieved with the optical-/electrical system shown in FIG. 5 and comprised of the light source 14a, the photoelectric sensor 14b, the weight hanger 15 which also modulates the light beam, the weights 16 selected to give the proper tension for the pulley system employed, the pulling line wind-up drum 17 attached to the variable speed motor 18 and interlocked with the photoelectric sensor via the motor controller 19 which controls take-up at constant line tension. An alternate system including a variable strength clutch with a constant speed motor and a controller with feed-back to set the proper amount of clutch slippage can be used in place of items 14 through 18. Both systems are activated from the braider control station to provide efficient coordination with the braiding operation. Automated return of the tensioning carriage and line is included in the system.

While the semipermeable membrane now carrying one layer of low denier reinforcing braided fiber is maintained wet, two separate layers of much heavier fiber are braided over the initial braided layer. A dacron polyester yarn of 4400 denier with zero twist has given excellent results. This high denier reinforcing braided fiber is applied in two separate layers, each layer making an angle with the axis of the semipermeable membrane of approximately 50° as shown in FIG. 4. It is to be noted that these layers are applied at an angle of approximately 50° which is less than the locking angle of 54 and ¾° while the initial fine denier layer is at an angle greater than its locking angle.

When the reinforcing brading operations have been completed, the assembly is ready for the coiling operation, while filled with hot water under pressure, and then the heat treating operation to establish the desired product flux and salt rejection characteristics. A typical coiling operation is described in our co-pending application above mentioned. One inch diameter reinforced semipermeable membrane has been routinely used over extended periods of time at a working pressure of 600 psig and has withstood test pressures of greater than 1750 psig.

We claim as our invention:

1. A tubular assembly adapted for use in ultrafiltration or reverse osmosis systems comprising a thin and mechanically fragile semipermeable tubular membrane surrounded only by a reinforcing fibrous braided structure to enable the semipermeable membrane to withstand high internal hydraulic pressures, said reinforcing fibrous braided structure including at least one layer of braided fiber supporting the semipermeable membrane, said fibers of said one layer being arranged at a locking angle with the axis of the tubular membrane when said membrane is under said high internal hydraulic pressure such that the said one layer makes the tubular assembly dimensionally stable in both axial and radial directions under said hydraulic pressure but which permits said assembly to be bent around comparatively small radius while pressurized at a pressure lower than said high internal hydraulic pressure without localized loss of support of the semi-permeable membrane and further including between said one layer of braided fiber and said semipermeable membrane an initial braided fibrous layer having a lower denier than the denier of the fiber of said one layer, said lower denier fiber being braided at an angle greater than the locking angle to obtain a higher density of braided material adjacent the semipermeable membrane to act as a support therefore at times when said internal pressure within the membrane is lower than said high internal pressure.

2. The tubular assembly defined in claim 1 further including an outside braided fibrous layer supporting the semipermeable membrane, said additional braided fibrous layer being arranged at a locking angle with respect to the tubular membrane when said membrane is under said high internal hydraulic pressure.

* * * * *